US006961126B2

(12) United States Patent
Belotserkovsky et al.

(10) Patent No.: US 6,961,126 B2
(45) Date of Patent: Nov. 1, 2005

(54) OPTICAL WAVELENGTH SPLITTER

(75) Inventors: Edward Belotserkovsky, San Francisco, CA (US); Steve Axelrod, Los Altos, CA (US); Igor N. Germanenko, Cupertino, CA (US); Jenson Luis, San Jose, CA (US)

(73) Assignee: Honeywell International Inc., Morristown, NJ (US)

( * ) Notice: Subject to any disclaimer, the term of this patent is extended or adjusted under 35 U.S.C. 154(b) by 124 days.

(21) Appl. No.: 10/692,325

(22) Filed: Oct. 23, 2003

(65) Prior Publication Data

US 2005/0088652 A1    Apr. 28, 2005

(51) Int. Cl.[7] .............................................. G01N 21/25
(52) U.S. Cl. ..................... 356/419; 356/416
(58) Field of Search ............... 356/419, 416, 356/417

(56) References Cited

U.S. PATENT DOCUMENTS

| | | | |
|---|---|---|---|
| 3,641,349 A * | 2/1972 | Dahlin | 250/350 |
| 4,459,690 A | 7/1984 | Corsover et al. | 369/44 |
| 4,647,206 A | 3/1987 | Kunzmann et al. | 356/358 |
| 5,090,802 A | 2/1992 | Longhurst | 356/73.1 |
| 5,995,235 A * | 11/1999 | Sui et al. | 356/419 |
| 6,075,592 A | 6/2000 | Banerjee et al. | 356/318 |
| 6,229,635 B1 | 5/2001 | Wulf | 359/196 |
| 6,272,270 B1 | 8/2001 | Okayama | 385/46 |
| 6,495,831 B1 * | 12/2002 | Hyvarinen et al. | 250/339.07 |
| 6,608,682 B2 * | 8/2003 | Ortyn et al. | 356/419 |

* cited by examiner

Primary Examiner—Zandra V. Smith
Assistant Examiner—Sarah J. Chisdes
(74) Attorney, Agent, or Firm—Fliesler Meyer LLP; Charles H. Jew

(57) ABSTRACT

Preferential optical splitters are used in a multichannel wavelength measurement device. The optical splitters preferentially provide light at a certain wavelength to a detector. Preferentially providing light to the detectors allows for increased optical efficiencies.

16 Claims, 5 Drawing Sheets

OPTICAL WAVELENGTH SPLITTER

BACKGROUND OF THE INVENTION

The present invention relates to optical spectroscopic detectors and especially to multichannel spectroscopic measurement units.

The optical energy detection at a particular optical wavelength is used for a number of different purposes. Often, detected light intensity at different wavelengths is used to produce a ratio that gives information about a process, such a paper making processes. Typically, one of the wavelengths is related to a process variation such as water level and another is a reference wavelength related to process conditions.

FIG. 1A shows a typical prior art system. In this system, light from optical path 102 is sent to an optical splitter 104, filter 106, focusing optics 108, to the optical energy detector 110. The optical energy detector 110 is adapted to detect light at the wavelength D1. Some of the light passes through the splitter 104; this light goes to the second splitter 112. Half of the light is sent to the optical energy detector 114. The other portion of the light is sent to the optical splitter 116. The optical splitter 116 sends half of the light to the optical energy detector 118 and half of the light to the optical mirror 120. The mirror 120 sends the light to the optical energy detector 122. In this example, more light is sent to the optical energy detector 110 than is sent to the other optical energy detectors 114, 118 and 122.

FIG. 1B illustrates a prior art system in which light from a fiber optic cable is split. In this example, the optical fiber 128 is split into three branches that equally distribute the light to the optical energy detectors 130, 132, 134 and 136 after passing through filters 138, 140, 142 and 143.

SUMMARY OF THE PRESENT INVENTION

The present invention uses wavelength preferential optical wavelength splitters in an optical path in order to be more efficient in optical wave energy wavelength separation than conventional optical splitters.

One embodiment of the present invention is a multichannel wavelength measuring device including multiple optical detectors. Each detector is adapted to detect light at a different wavelength. The multichannel wavelength device also includes a sequence of optical wavelength splitters in an optical path. Each of the optical splitters is adapted to preferentially provide light to a least one of the detectors at the desired detecting wavelength of the detector.

One embodiment of the present invention uses optical splitters to preferentially provide light from an optical path to detectors at the desired detected wavelength of the detectors. The method also uses the detector to detect light at the desired detected wavelength.

DETAILED DESCRIPTION

Figure 1A:
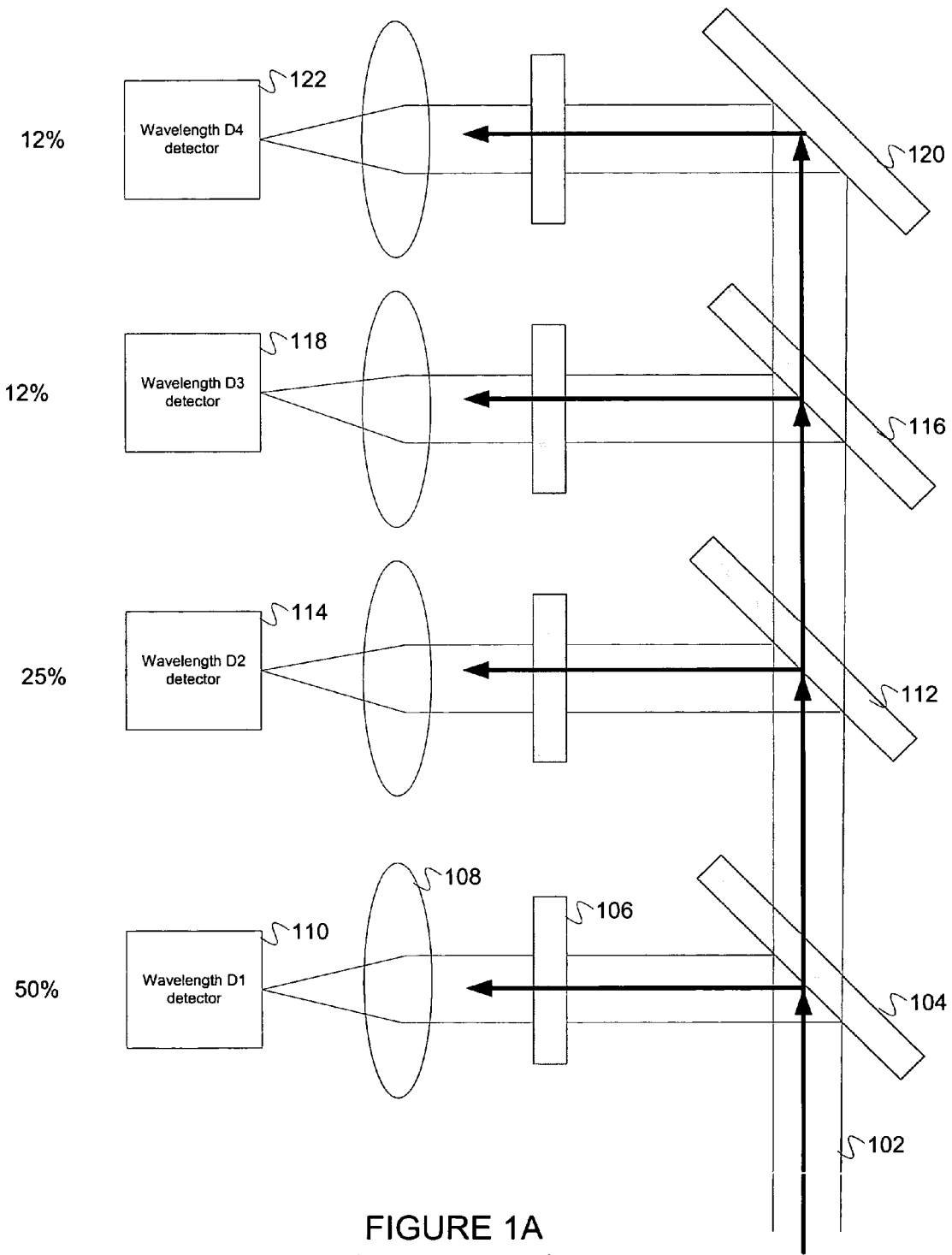
FIG. 1A is a diagram that illustrates a prior art system using optical splitters.
Figure 1B:
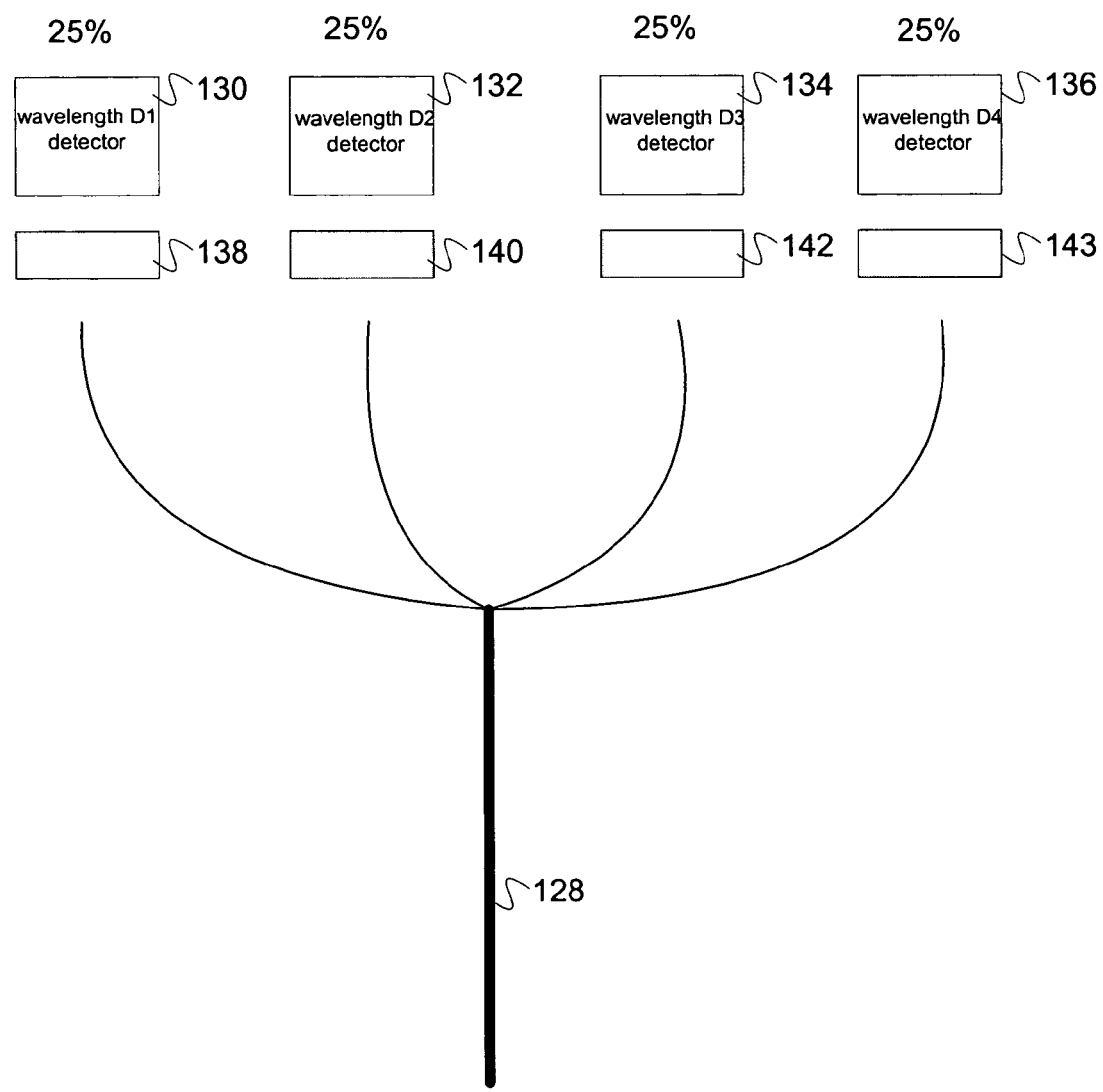
FIG. 1B is a diagram that illustrates a prior art fiber optical splitter.
Figure 2:
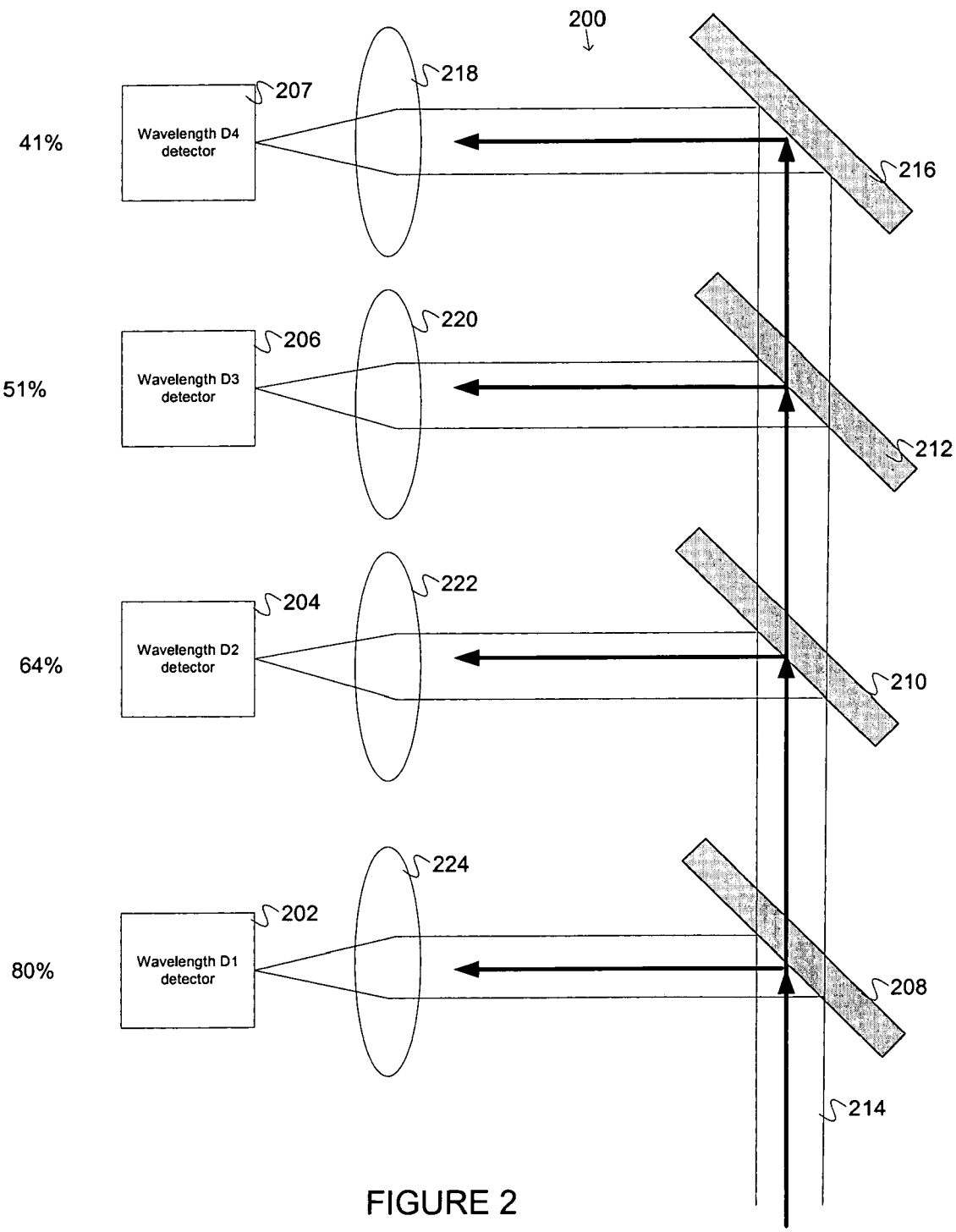
FIG. 2 is a diagram that illustrates an embodiment of the present invention using filter that preferentially provides light at certain wavelengths to optical detectors.

FIG. 2 shows a multichannel wavelength measurement device 200. Multiple optical detectors are provided to detect light at different wavelengths. In this example, detectors 202, 204, 206 and 207 shown. These detectors can be of conventional design used to detect light at certain wavelengths. For the purposes of this patent application, the term "light" includes both visible light and other forms of optical energy, such as infrared light. A sequence of optical splitters 207, 210 and 212 are placed in the optical path 214. The optical splitters are adapted to preferentially provide enough light to one of the detectors at the desired detected wavelength of the detector. For example, in FIG. 2, the optical splitter 208 preferentially reflects light at wavelength D1 to the optical detector. In one embodiment, the optical splitter 208 preferably transmits light at the wavelengths D2, D3, and D4 to detectors 207, 204 and 206. Also shown in FIG. 2 is an optical mirror 216. The optics 218, 220, 222 and 224 can be used to focus the light to the detectors 202, 204, 206 and 207. Looking again at FIG. 2 note that this embodiment does not show filters associated with the detectors 202, 204, 206 and 207. However, additional optical band pass filters may be used to further filter the light energy going to the detectors.

The efficiency of the optical energy detected is improved over the prior art systems. By preferentially providing light using the optical splitters rather than using a traditional optical splitter, more of the optical energy at the wavelengths of interest are sent to the detectors. Preferentially providing light means reflecting or transmitting light at a desired wavelength more than at other wavelengths. FIG. 2 illustrates an example where 80% of the optical energy of interest is removed from the optical path by each optical splitter. The system of the present invention can be calibrated so that it can compensate for splitter transmission variations. In one embodiment, this calibration is done by sending a test signal through the system and measuring the output from the detectors. Such a calibration is typically already required due to variations in the detector and optics alignment.

FIG. 2 shows light of specific wavelengths being extracted from a single optical path section. The optical path can also be fanned out with both reflective and transmitted light from an optical filter 208 sent to additional optical splitters.

Figure 3A:
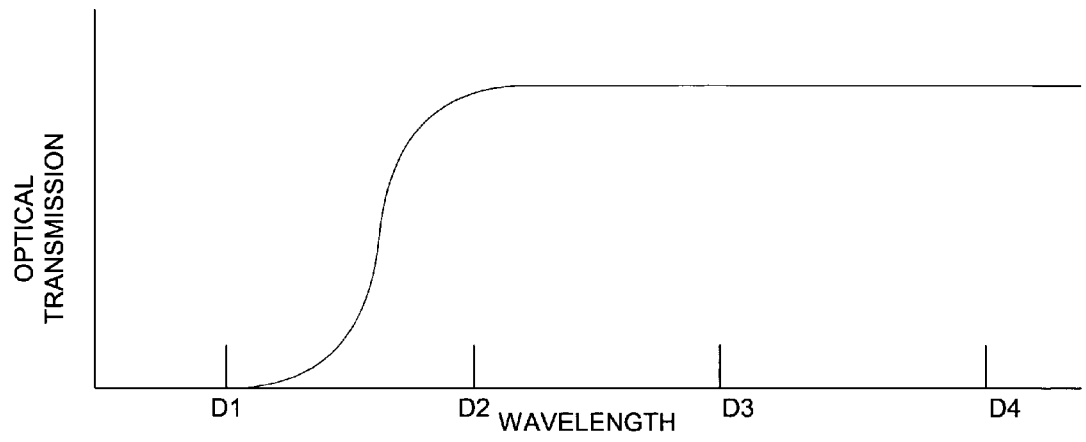
FIG. 3A-3C is a diagram that illustrates an exemplanary embodiment of the optical transmission characteristics of the optical splitters of FIG. 2.
Figure 3B:
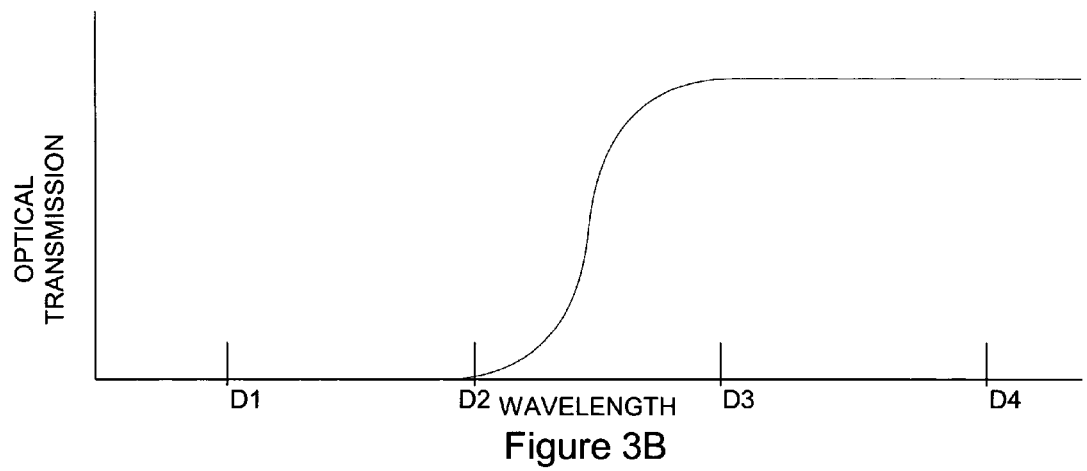
Figure 3C:
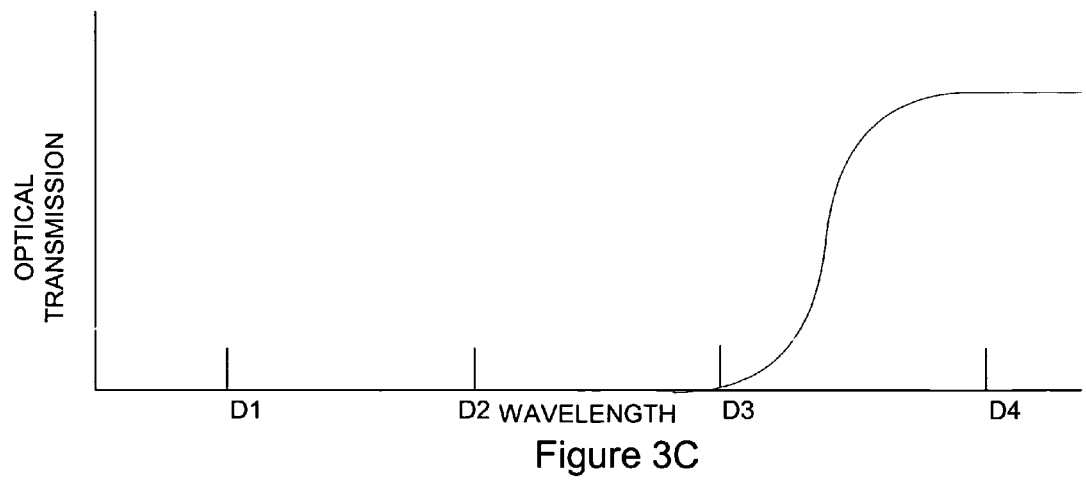

FIG. 3A illustrates exemplary optical transmission characteristics of the optical filter 208 of FIG. 2. Note that the energy at wavelength D1 is reflected while energy wavelengths of D2, D3 and D4 are transmitted. The advantage of optical splitter of FIG. 2 is that a large percentage of the energy at D1 is transmitted to the optical detector 202 while allowing the energy of other wavelengths to be transmitted to the other detectors. FIG. 3B shows an optical splitter in which a large percentage of the energy at wavelength D1 is reflected to the detector 204 while energy at wavelengths, D3 and D4 are transmitted to the other detectors. FIG. 3C shows an optical splitter for which energy at wavelength D3 is sent to detector 206 while energy at wavelength D4 is transmitted to be sent to the detector 207.

The selective optical splitters can be produced in a number of different fashions. For example, dialectic material can be deposited upon a glass surface to form a stack that preferentially transmit light at certain frequencies. Such optical high or low pass filters for use as splitters are commercially available. In one embodiment, the light enters the optical splitter at an angle and this can effect the transmission characteristics. In the example of FIGS. 3A–3C each of the optical splitters operates as a high pass filter.

Figure 4:
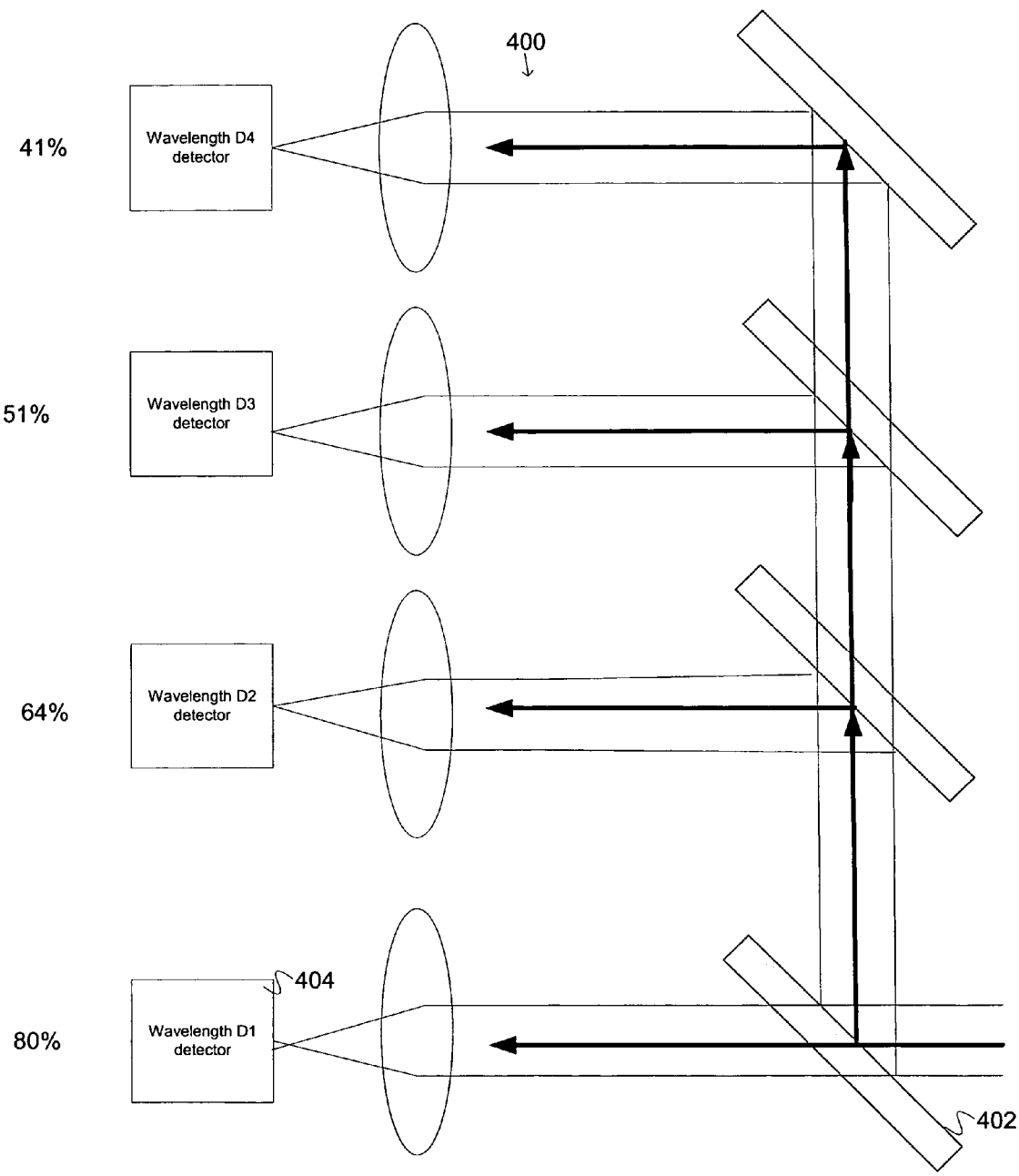
FIG. 4 is a diagram that illustrates an alternate embodiment of the present invention.

FIG. 4 shows a system 400 with an optical splitter 402 that operates as a low pass filter passing light at the wavelength D1 to the wavelength detector 404 while reflecting light at wavelengths D2, D3 and D4 to the remainder of the system.

Multi-wavelength optical detectors are used in the pulp and paper industry for example in moisture and coat weight sensors. A detected signal at a wavelength that indicates the presence of water can be divided by detected signal at a reference wavelength. The use of the reference wavelength removes the dependency of the system to source or path variations.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A multichannel wavelength measurement device comprising:
   multiple optical detectors, each detector adapted to detect light at a different wavelength; and
   a sequence of optical wavelength splitters in an optical path, each of the optical splitters adapted to provide light to one of the detectors at the desired detected wavelength of the detector wherein one desired detected wavelength is at a wavelength that indicates the presence of water in paper wherein a first detector receives light provided by a first optical splitter, the first optical splitter providing light at a second wavelength to a second optical splitter which provides the light at the second wavelength to a second optical detector wherein the optical splitters are pass filters wherein at least one of the pass filters is a high pass filter or a low pass filter and wherein the multichannel wavelength measurement device is used to determine characteristics of paper.

2. The multichannel wavelength measurement device of claim 1, wherein at least one of the pass filters is a high pass filter.

3. The multichannel wavelength measurement device of claim 1, wherein at least one of the pass filters is a low pass filter.

4. The multichannel wavelength measurement device of claim 1, wherein the providing of light for one of the optical splitters is done by reflecting light at the wavelength.

5. The multichannel wavelength measurement device of claim 1, wherein the providing of light at the wavelength is done by transmitting light at the wavelength.

6. The multichannel wavelength measurement device of claim 1 wherein the first and second optical splitters are optical high pass filters.

7. The multichannel wavelength measurement device of claim 1 wherein the first and second optical splitters are optical low pass filters.

8. The multichannel wavelength measurement device of claim 1 wherein the detectors detect light at a first wavelength that indicates the presence of water to generate a first detected signal and detect light at a second wavelength to generate a second detected signal that serves as a reference and the device obtains a ratio of the first detected signal to the second detected signal.

9. A method of determining characteristics of paper comprising:
   using optical wavelength splitters to provide light from an optical path to detectors at desired detected wavelengths of the detectors wherein one desired detected wavelength is at a wavelength that indicates the presence of water in the paper; and
   using the detectors to detect light at the desired detected wavelengths wherein a first optical splitter provides light at a first wavelength to a first detector and provides a light at a second wavelength to a second optical splitter, the second optical splitter providing light at the second wavelength to a second detector and wherein the optical splitters are optical pass filters and at least one of the pass filters is an optical high pass filter or an optical low pass filter.

10. The method of claim 9, wherein at least one of the optical pass filters is an optical high pass filter.

11. The method of claim 9, wherein at least one of the optical pass filter is an optical low pass filter.

12. The method of claim 9, wherein the first and second optical splitters are optical high pass filters.

13. The method of claim 9, wherein the providing of light at the wavelength by one of the optical splitters is done by reflecting light.

14. The method of claim 9, wherein the providing of light at the wavelength by one of the optical splitters is done by transmitting light.

15. The method of claim 9 wherein the first and second optical splitters are optical low pass filters.

16. The method of claim 9 wherein the detectors are employed (i) to detect light at a first wavelength that indicates the presence of water and to generate a first detected signal and (ii) to detect light at a second wavelength to generate a second detected signal that serves as a reference and the method further comprises the step of obtaining a ratio of the first detected signal to the second detected signal.

* * * * *